US008892639B2

(12) United States Patent
Kao

(10) Patent No.: US 8,892,639 B2
(45) Date of Patent: Nov. 18, 2014

(54) METHOD AND SYSTEM FOR PROCESSING FILE STORED IN CLOUD STORAGE AND COMPUTER READABLE STORAGE MEDIUM STORING THE METHOD

(71) Applicant: Institute for Information Industry, Taipei (TW)

(72) Inventor: Chia-Hung Kao, Taitung County (TW)

(73) Assignee: Institute for Information Instustry, Taipei (TW)

( * ) Notice: Subject to any disclaimer, the term of this patent is extended or adjusted under 35 U.S.C. 154(b) by 217 days.

(21) Appl. No.: 13/707,614

(22) Filed: Dec. 7, 2012

(65) Prior Publication Data

US 2014/0136600 A1  May 15, 2014

(30) Foreign Application Priority Data

Nov. 14, 2012  (TW) .............................. 101142396 A

(51) Int. Cl.
*G06F 15/16*  (2006.01)
*H04L 29/06*  (2006.01)

(52) U.S. Cl.
CPC ............................... *H04L 29/06047* (2013.01)
USPC ......................................................... 709/203

(58) Field of Classification Search
USPC .................................. 709/203, 229; 345/420
See application file for complete search history.

(56) References Cited

U.S. PATENT DOCUMENTS

| 5,671,428 | A | * | 9/1997 | Muranaga et al. | ............ 715/751 |
| 7,216,289 | B2 | * | 5/2007 | Kagle et al. | .................. 715/256 |
| 7,702,802 | B2 | * | 4/2010 | Stillion et al. | ................ 709/229 |
| 2006/0123011 | A1 | * | 6/2006 | Stillion et al. | .................. 707/10 |
| 2010/0030578 | A1 | * | 2/2010 | Siddique et al. | .................. 705/3 |
| 2013/0066750 | A1 | * | 3/2013 | Siddique et al. | ............. 705/27.2 |
| 2013/0215116 | A1 | * | 8/2013 | Siddique et al. | ............. 345/420 |
| 2013/0247223 | A1 | * | 9/2013 | Park et al. | ........................ 726/28 |
| 2014/0136600 | A1 | * | 5/2014 | Kao | ............................... 709/203 |

* cited by examiner

*Primary Examiner* — Tammy Nguyen
(74) *Attorney, Agent, or Firm* — CKC & Partners Co., Ltd.

(57) ABSTRACT

A method for processing a file stored in cloud storage includes the following step: an original file is added to a sharing folder, which belongs to the owner account for sharing to at least one sharing account, on a cloud storage machine through an owner client device, which is logged in an owner account. The original file stored in the sharing folder is synchronized to at least one sharing client device, which is logged in the at least one sharing account. At least one changed file, which is amended utilizing the original file, is received from the at least one sharing client device. Difference between the at least one changed file and the original file is generated to be taken as at least one changed content. A summary about the at least one changed content is generated for being displayed on the owner client device.

9 Claims, 3 Drawing Sheets

METHOD AND SYSTEM FOR PROCESSING FILE STORED IN CLOUD STORAGE AND COMPUTER READABLE STORAGE MEDIUM STORING THE METHOD

RELATED APPLICATIONS

This application claims priority to Taiwan Application Serial Number 101142396, filed Nov. 14, 2012, which is herein incorporated by reference.

BACKGROUND

1. Technical Field

The present invention relates to a method and system for processing a file stored in cloud storage and a computer readable storage medium for storing the method.

2. Description of Related Art

As network technology develops, various network services are provided through networks. Particularly, cloud computing is a hot one among the network technology.

Cloud computing is the use of computing resources that are delivered over a network. Hardware/software resources and message are shared through a network with cloud computing. Cloud storage service is one of the most popular cloud computing services.

Cloud storage service provides an online storage to store data on several virtual servers. Some cloud storage services can provide a synchronization function to synchronize data to other related devices when the stored data is amended. However, users may not know which part of data is changed, which may disturb users.

SUMMARY

According to one embodiment of this invention, a method for processing a file stored in cloud storage is disclosed to provide a summary about a changed file, which is amended by some one other than the owner, to the owner. The method includes the following steps:
  (a) an original file is added to a sharing folder on a cloud storage machine through an owner client device, which is logged in an owner account. Wherein, the sharing folder belongs to the owner account for sharing to at least one sharing account.
  (b) the original file stored in the sharing folder is synchronized to at least one sharing client device, which is logged in the at least one sharing account.
  (c) at least one changed file, which is amended utilizing the original file, is received from the at least one sharing client device.
  (d) the at least one changed file is compared with the original file to generate at least one difference between the at least one changed file and the original file to be taken as at least one changed content.
  (e) a summary about the at least one changed content is generated.
  (f) the summary is displayed on the owner client device.

According to another embodiment of this invention, a computer-readable storage medium storing a computer program for executing the steps of the aforementioned method for processing a file stored in cloud storage is provided. Steps of the method are as disclosed above.

According to another embodiment of this invention, a system for processing a file stored in cloud storage is disclosed. The system includes a network card, a storage unit and a processing unit. The processing unit is electrically connected with the network card and the storage unit. The network card builds a connection with a network. The processing unit includes a cloud-storage providing module, a file adding module, a synchronizing module, a changed-file receiving module, a comparing module and a summary transmitting module. The cloud-storage providing module provides the storage unit as a cloud storage space through the network. The file adding module receives an original file from an owner client device, which is logged in an owner account. The original file is added to a sharing folder on the cloud storage space. Wherein, the sharing folder belongs to the owner account for sharing to at least one sharing account. The synchronizing module synchronizes the original file stored in the sharing folder to at least one sharing client device, which is logged in the at least one sharing account. The changed-file receiving module receives at least one changed file, which is amended utilizing the original file, from the at least one sharing client device. The comparing module compares the at least one changed file with the original file to generate at least one difference between the at least one changed file and the original file to be taken as at least one changed content. The comparing module generates a summary about the at least one changed content. The summary transmitting module transmits the summary to the owner client device, such that the owner client device displays the summary.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
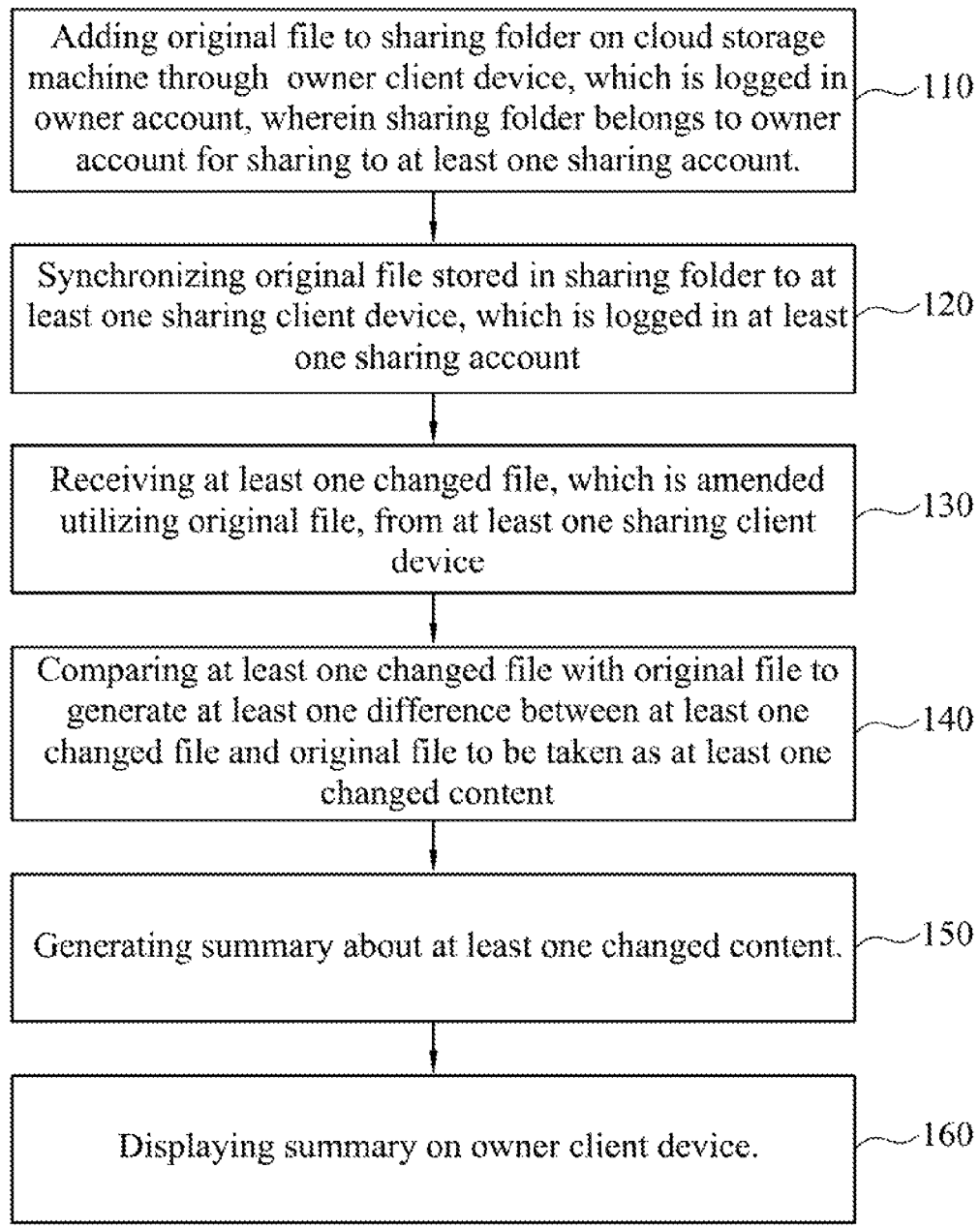
FIG. 1 is a flow diagram of a method for processing a file stored in cloud storage according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for processing a file stored in cloud storage according to one embodiment of this invention. In the method, a summary about a changed file, which is amended by some one other than the owner, is provided to the owner. The method may take the form of a computer program product stored on a computer-readable storage medium having computer-readable instructions embodied in the medium. Any suitable storage medium (such as non-transitory medium) may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The method 100 include the following steps:

At step 110, an original file is added to a sharing folder on a cloud storage machine through an owner client device, which is logged in an owner account. Wherein, the sharing folder belongs to the owner account for sharing to at least one sharing account. The owner client device may be a computer, a laptop, a server, a mobile phone or any other electrical device, which can connect to the cloud storage machine through the network. In other words, a user can utilize the owner client device to log in his/her owner account and add files to the sharing folder for sharing to the at least one sharing account (step 110).

At step 120, the original file stored in the sharing folder is synchronized to at least one sharing client device, which is logged in the at least one sharing account. In other words, when the sharing account is utilized to log in, the sharing client device, which is logged in the sharing account, can receive the original file stored in the sharing folder for synchronization (step 120). The sharing client device may be a computer, a laptop, a server, a mobile phone or any other electrical device, which can connect to the cloud storage machine through the network.

At step 130, at least one changed file, which is amended utilizing the original file, is received from the at least one sharing client device. In other words, a user may amend the original file to generate the changed file through the sharing client device, such that the changed file can be received at step 130.

At step 140, the at least one changed file is compared with the original file to generate at least one difference between the at least one changed file and the original file to be taken as at least one changed content. In one embodiment of step 140, the changed file may be compared with the original file word by word. In another embodiment of step 140, any other algorithm for comparing difference between files can be utilized to generate the difference between the changed file and the original file.

At step 150, a summary about the at least one changed content is generated. In one embodiment of step 150, changed locations of the changed content (such as line numbers, page numbers, paragraph numbers or any other location related information) may be analyzed and embedded in the summary. In another embodiment of step 150, instructions being utilized to amend the changed content (such as underline instructions, highlight instructions or any other word effect operation, add, amend, delete or any other file operation) may be analyzed and embedded in the summary. In still another embodiment of step 150, information of the sharing account, which is utilized to do the amendment, may be embedded in the summary.

Figure 2:
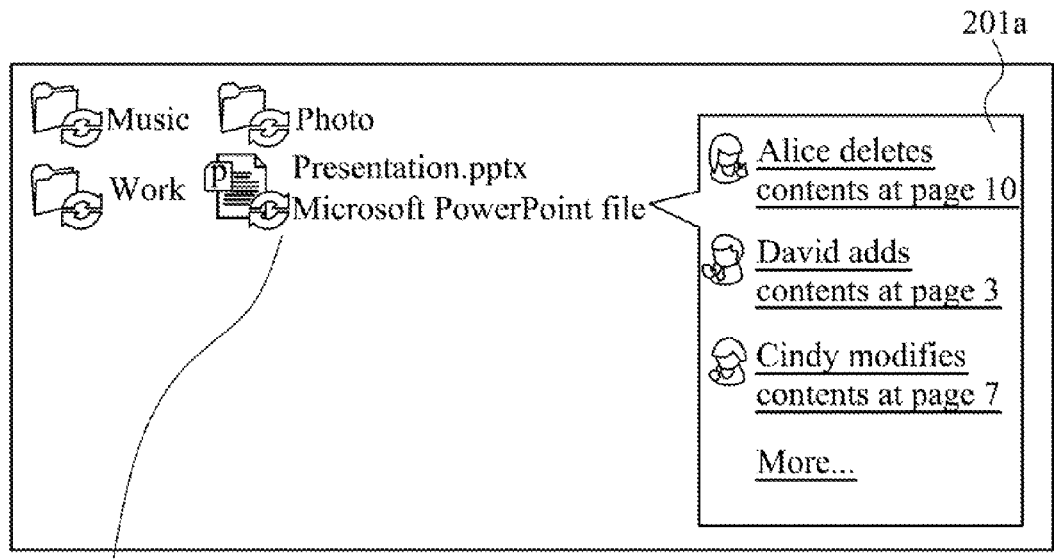
FIG. 2 illustrates an embodiment of the summary displayed on the owner client device.

At step 160, the summary is displayed on the owner client device. Referring to FIG. 2, an embodiment of the summary displayed on the owner client device is illustrated. In this embodiment, changed files, which are amended utilizing the original file, can be respectively received from one or more sharing client devices at step 130. At step 140, the changed files are respectively compared with the original file to respectively generate difference between the changed files and the original file to be taken as changed contents. At step 150, a summary about the changed contents is generated for being displayed at step 160. For example, in one embodiment of step 160, a message window 201a may be displayed at a block 201 of a display unit of the owner client device, which corresponds to the original file. The summary about the changed files, which are amended by the sharing account Alice, David and Cindy, are displayed in the message window 201a. As a result, the owner can easily understand how others amend his/her file without opening the changed file(s).

In one embodiment of this invention, the method 100 may further include the following steps: when an accept-change signal for accepting the at least one changed content is received from the owner client device, the at least one changed content may be accepted to the original file stored in the sharing folder. In addition, after the changed content is accepted, the changed-content-accepted original file may be synchronized to other sharing client devices, which are logged in the at least one sharing account.

Figure 3:
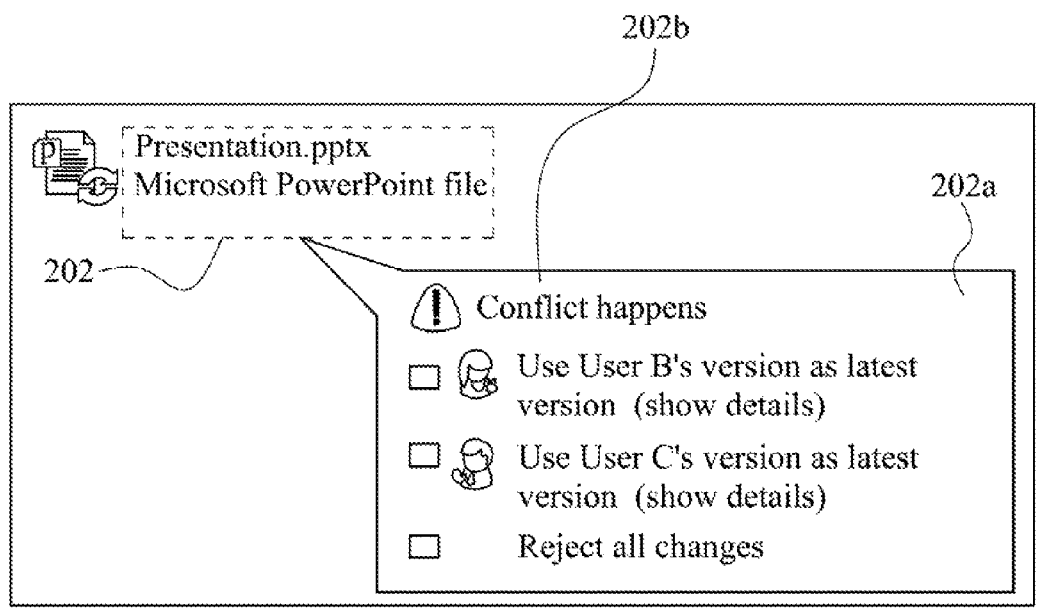
FIG. 3 illustrates an embodiment of a selection list.

When the number of the at least one changed file is more than one, if there is any conflict between the changed contents may be determined. Hence, the method 100 may further include the following steps: the changed files may be respectively compared with the original file to respectively generate differences between the changed files and the original file to be taken as the changed contents. Subsequently, determine if there is any conflict between the changed contents. When there is at least one conflict between the changed contents, a selection list may be provided for selecting one of the conflicted changed contents. Referring to FIG. 3, an embodiment of a selection list is illustrated. In this embodiment, a selection list 202a for selecting one of the conflicted changed contents, which are amended by User B or User C, is displayed at a block 202 of a display unit of the owner client device, which corresponds to the original file. In addition, a conflict warning message 202b can be further displayed in the selection list 202a to notice a user of the owner client device that there is conflict between the changed files. When a selection signal is received through the selection list to select one of the conflicted changed contents, the conflicted changed contents other than the selected one are deleted from the summary. Therefore, it can be avoided that amendment error occurs due to conflict between the changed files.

In another embodiment of this invention, the method 100 may further include the following steps: when a eject-change signal to reject the at least one changed contents is received from the owner client device, the at least one changed content is deleted from the summary.

Figure 4:
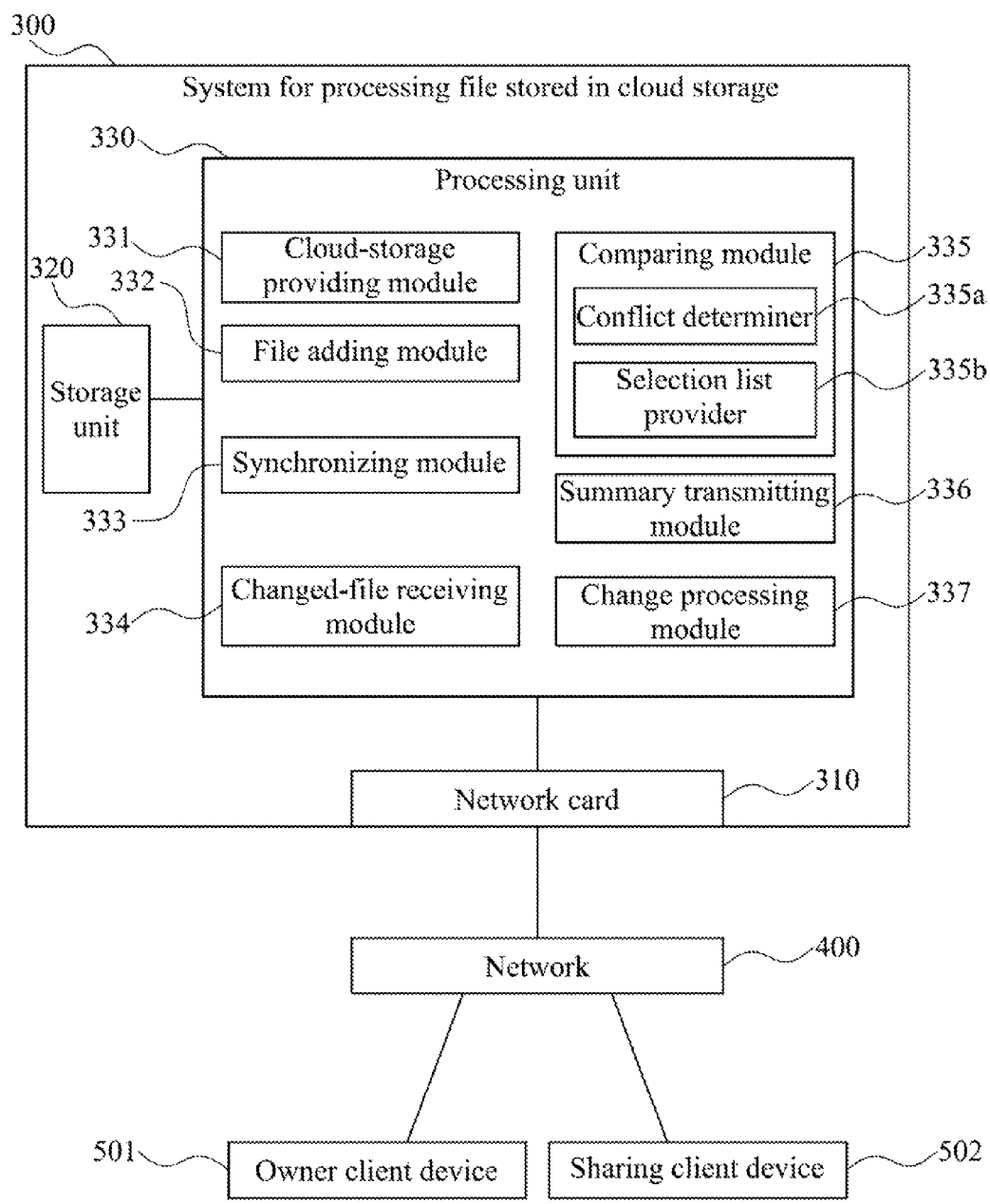
FIG. 4 illustrates a block diagram of a system for processing a file stored in cloud storage according to an embodiment of this invention.

FIG. 4 illustrates a block diagram of a system for processing a file stored in cloud storage according to an embodiment of this invention. The system 300 includes a network card 310, a storage unit 320 and a processing unit 330. The processing unit 330 is electrically connected with the network card 310 and the storage unit 320. In one embodiment of this invention, the processing unit 330 may be provided by a single computer, machine, server or a processing unit of any other electrical device. In another embodiment of this invention, the processing unit may be discretely provided by several computers, machines, servers, or processing units of other electrical devices or combination thereof.

The network card 310 builds a connection with a network 400 utilizing a wired or wireless network communication protocol.

The processing unit 330 includes a cloud-storage providing module 331, a file adding module 332, a synchronizing module 333, a changed-file receiving module 334, a comparing module 335 and a summary transmitting module 336. The cloud-storage providing module 331 provides the storage unit 320 as a cloud storage space through the network 400.

Hence, when a user utilizes the owner client device 501 to log in his/her owner account, he/she can add an original file for sharing to a sharing folder on the cloud storage space. When synchronization is performed, the owner client device 501 may transmit the original file to the system 300 through the network 400, such that the file adding module 332 can receive the added original file. The owner client device 501 may be a computer, a laptop, a server, a mobile phone or any other electrical device, which can connect to the system 300 through the network 400.

The file adding module 332 receives an original file from the owner client device 501, which is logged in an owner account. The file adding module 332 adds the original file to a sharing folder on the cloud storage space. Wherein, the sharing folder belongs to the owner account for sharing to at least one sharing account.

The synchronizing module 333 synchronizes the original file stored in the sharing folder to at least one sharing client device 502, which is logged in the at least one sharing account. Hence, when the sharing client device 502 is utilized to log in the sharing account, which is authorized to access the sharing folder, the sharing client device 502 can receive the original file stored in the sharing folder after synchronization. The sharing client device 502 may be a computer, a laptop, a server, a mobile phone or any other electrical device, which can connect to the system 300 through the network 400.

The changed-file receiving module 334 receives at least one changed file, which is amended utilizing the original file, from the at least one sharing client device 502. In other words, a user may amend the original file to generate the changed file through the sharing client device 502, such that the changed-file receiving module 334 can receive the changed file after synchronization.

The comparing module 335 compares the at least one changed file with the original file to generate at least one difference between the at least one changed file and the original file to be taken as at least one changed content. In one embodiment of this invention, the comparing module 335 may compare the changed file with the original file word by word. In another embodiment of this invention, the comparing module 335 may utilize any other algorithm for comparing difference between files.

Subsequently, the comparing module 335 generates a summary about the at least one changed content. In one embodiment of this invention, the comparing module 335 may further analyze changed locations of the changed content (such as line numbers, page numbers, paragraph numbers or any other location related information) to be embedded in the summary. In another embodiment this invention, the comparing module 335 may further analyze instructions being utilized to amend the changed content (such as underline instructions, highlight instructions or any other word effect operation, add, amend, delete or any other file operation) to be embedded in the summary. In still another embodiment, the comparing module 335 may embed information of the sharing account, which is utilized to do the amendment, in the summary.

The summary transmitting module 336 transmits the summary to the owner client device 501, such that the owner client device 501 displays the summary on its display unit. As a result, the owner can easily understand how others amend his/her file without opening the changed file(s).

In one embodiment of this invention, the processing unit 330 may further include a change processing module 337. When an accept-change signal for accepting the at least one changed content is received from the owner client device 501 through the network 400, the change processing module 337 accepts the at least one changed content to the original file stored in the sharing folder. In addition, the synchronizing module 333 may synchronize the changed-content-accepted original file to the sharing client device 502, which is logged in the at least one sharing account.

When the number of the at least one changed file is more than one, if there is any conflict between the changed contents may be determined. Hence, the comparing module 335 may include a conflict determiner 335a and a selection list provider 335b. When the number of the at least one changed file is more than one, the comparing module 335 respectively compares the changed files with the original file to respectively generate differences between the changed files and the original file to be taken as the changed contents. The conflict determiner 335a determines if there is any conflict between the changed contents. When there is at least one conflict between the changed contents, the selection list provider 335b provides a selection list for selecting one of the conflicted changed contents. Subsequently, when a user of the owner client device 501 does selection through the selection list, the owner client device 501 transmits a selection signal to select one of the conflicted changed contents to the system 300. Hence, when the selection signal is received, the change processing module 337 deletes the conflicted changed contents other than the selected one from the summary. Therefore, it can be avoided that amendment error occurs due to conflict between the changed files.

In addition, when a reject-change signal to reject the at least one changed contents is received from the owner client device 501, the change processing module 337 deletes the at least one changed content from the summary.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for processing a file stored in cloud storage comprising:
   (a) adding an original file to a sharing folder on a cloud storage machine through an owner client device, which is logged in an owner account, wherein the sharing folder belongs to the owner account for sharing to at least one sharing account;
   (b) synchronizing the original file stored in the sharing folder to at least one sharing client device, which is logged in the at least one sharing account;
   (c) receiving at least one changed file, which is amended utilizing the original file, from the at least one sharing client device;
   (d) comparing the at least one changed file with the original file to generate at least one difference between the at least one changed file and the original file to be taken as at least one changed content;
   (e) generating a summary about the at least one changed content; and
   (f) displaying the summary on the owner client device.

2. The method of claim 1 further comprising:
when an accept-change signal for accepting the at least one changed content is received from the owner client device, accepting the at least one changed content to the original file stored in the sharing folder.

3. The method of claim 2 wherein when the number of the at least one changed file is more than one, the step (d) comprises:
respectively comparing the changed files with the original file to respectively generate differences between the changed files and the original file to be taken as the changed contents;
determining if there is any conflict between the changed contents;
when there is at least one conflict between the changed contents, providing a selection list for selecting one of the conflicted changed contents; and
when a selection signal is received through the selection list to select one of the conflicted changed contents, deleting the conflicted changed contents other than the selected one from the summary.

4. The method of claim 1 further comprising:
when a reject-change signal to reject the at least one changed contents is received from the owner client device, deleting the at least one changed content from the summary.

5. A system for processing a file stored in cloud storage comprising:
a network card for building a connection with a network;
a storage unit; and
a processing unit electrically connected with the network card and the storage unit, wherein the processing unit comprising:
a cloud-storage providing module for providing the storage unit as a cloud storage space through the network;
a file adding module for receiving an original file from an owner client device, which is logged in an owner account, and adding the original file to a sharing folder on the cloud storage space, wherein the sharing folder belongs to the owner account for sharing to at least one sharing account;
a synchronizing module for synchronizing the original file stored in the sharing folder to at least one sharing client device, which is logged in the at least one sharing account;
a changed-file receiving module for receiving at least one changed file, which is amended utilizing the original file, from the at least one sharing client device;
a comparing module for comparing the at least one changed file with the original file to generate at least one difference between the at least one changed file and the original file to be taken as at least one changed content, and generating a summary about the at least one changed content; and
a summary transmitting module for transmitting the summary to the owner client device, such that the owner client device displays the summary.

6. The system of claim 5, wherein the processing unit further comprises:
a change processing module for accepting the at least one changed content to the original file stored in the sharing folder when an accept-change signal for accepting the at least one changed content is received from the owner client device.

7. The system of claim 6, wherein:
when the number of the at least one changed file is more than one, the comparing module respectively compares the changed files with the original file to respectively generate differences between the changed files and the original file to be taken as the changed contents, wherein the comparing module comprises:
a conflict determiner for determining if there is any conflict between the changed contents; and
a selection list provider for providing a selection list for selecting one of the conflicted changed contents when there is at least one conflict between the changed contents;
when a selection signal is received through the selection list to select one of the conflicted changed contents, the change processing module deletes the conflicted changed contents other than the selected one from the summary.

8. The system of claim 5, wherein the processing unit further comprises:
a change processing module for deleting the at least one changed content from the summary when a reject-change signal to reject the at least one changed contents from the owner client device.

9. A non-transitory computer readable storage medium with a computer program to execute a method for processing a file stored in cloud storage, wherein the method comprises:
(a) adding an original file to a sharing folder on a cloud storage machine through an owner client device, which is logged in an owner account, wherein the sharing folder belongs to the owner account for sharing to at least one sharing account;
(b) synchronizing the original file stored in the sharing folder to at least one sharing client device, which is logged in the at least one sharing account;
(c) receiving at least one changed file, which is amended utilizing the original file, from the at least one sharing client device;
(d) comparing the at least one changed file with the original file to generate at least one difference between the at least one changed file and the original file to be taken as at least one changed content;
(e) generating a summary about the at least one changed content; and
(f) displaying the summary on the owner client device.

* * * * *